March 3, 1970 — R. C. RAYNOR — 3,498,468
SEDIMENTATION TANK
Filed Jan. 14, 1969 — 12 Sheets-Sheet 1
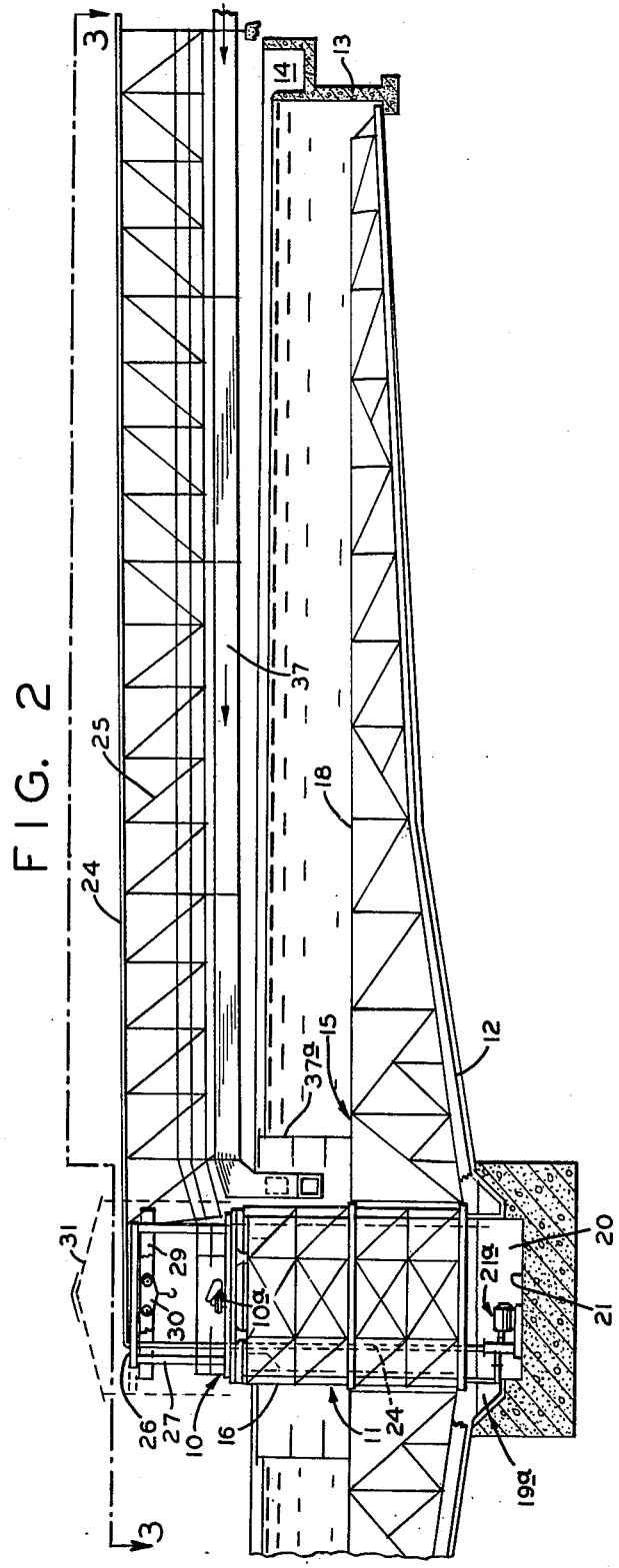
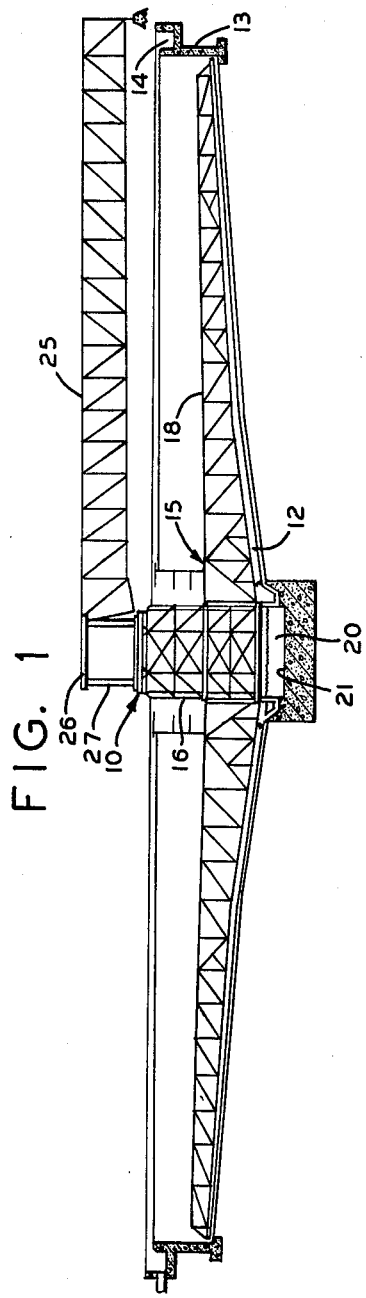
INVENTOR.
RUSSELL C. RAYNOR
BY
ATTORNEY.

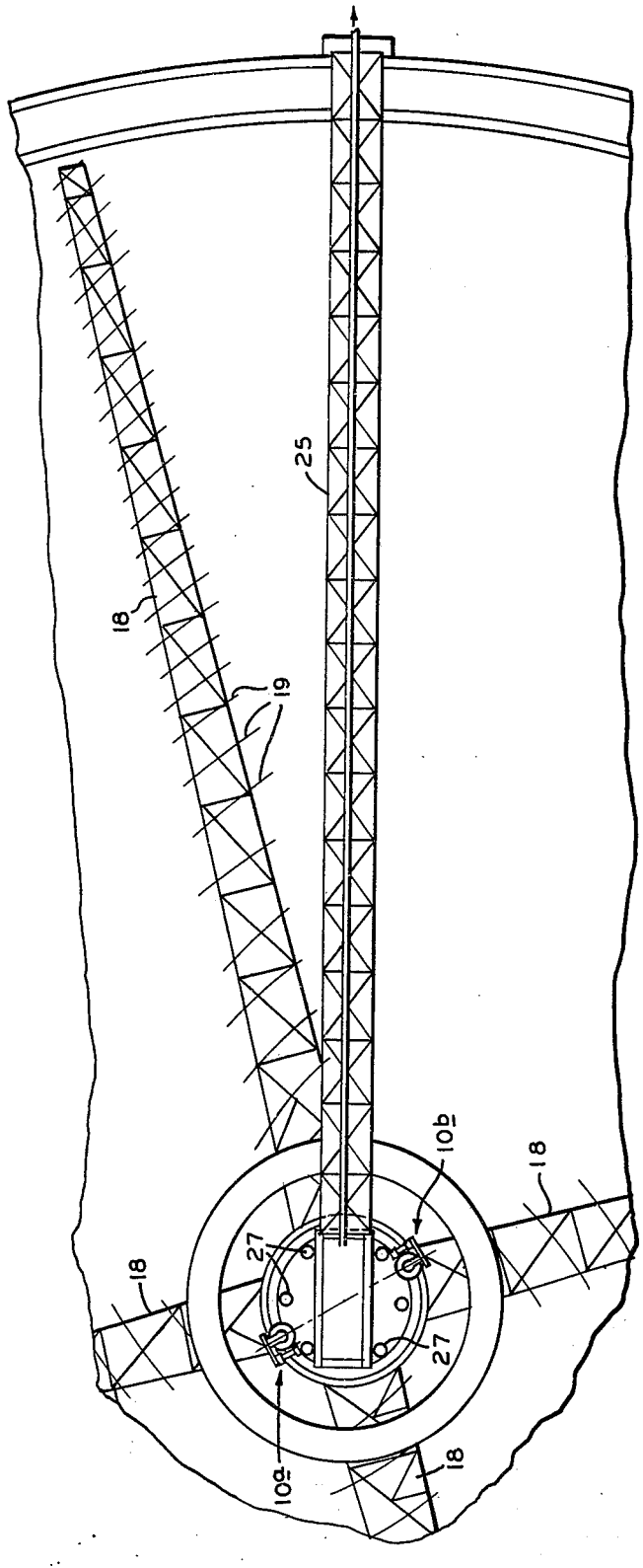

March 3, 1970

R. C. RAYNOR 3,498,468

SEDIMENTATION TANK

Filed Jan. 14, 1969

INVENTOR.
RUSSELL C. RAYNOR
BY
ATTORNEY.

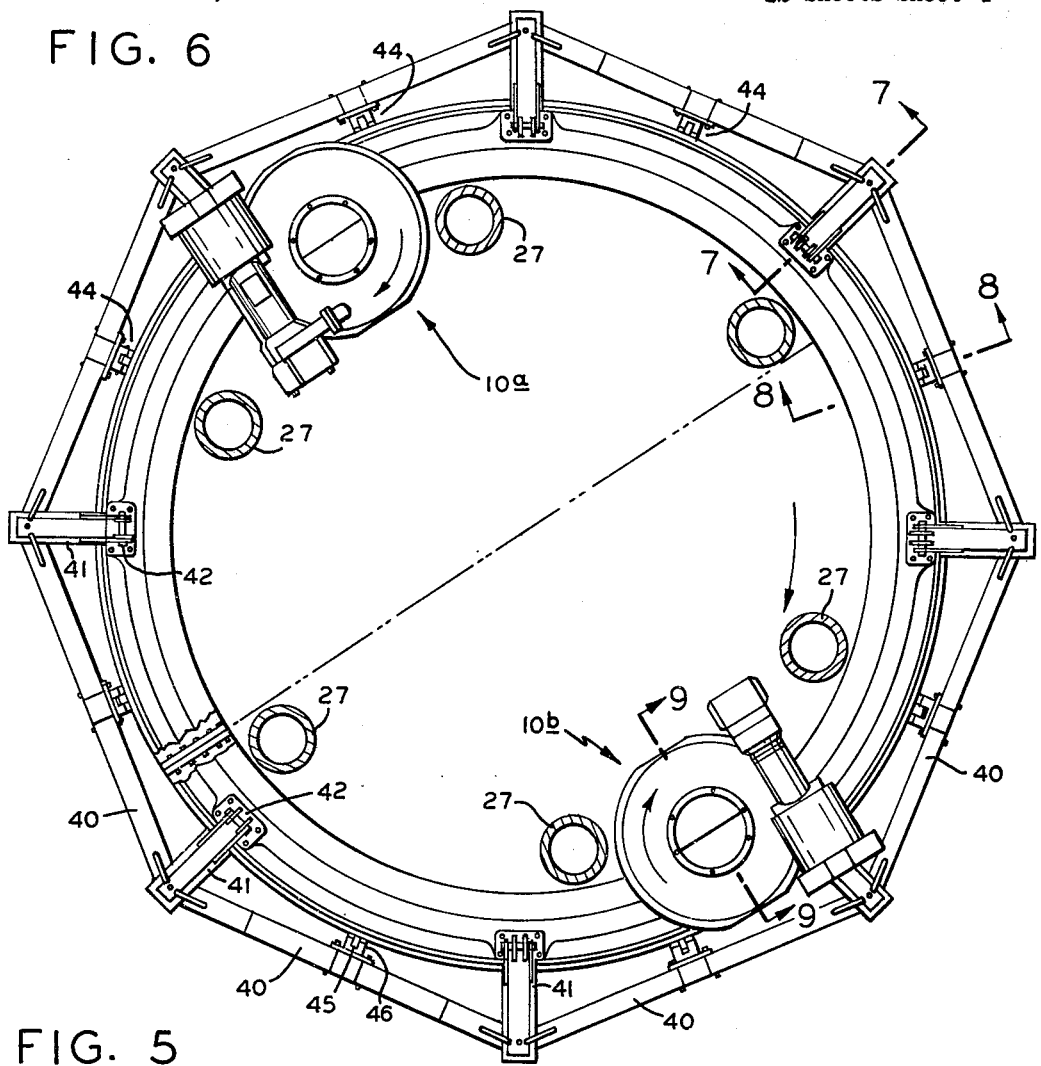
FIG. 6
FIG. 5
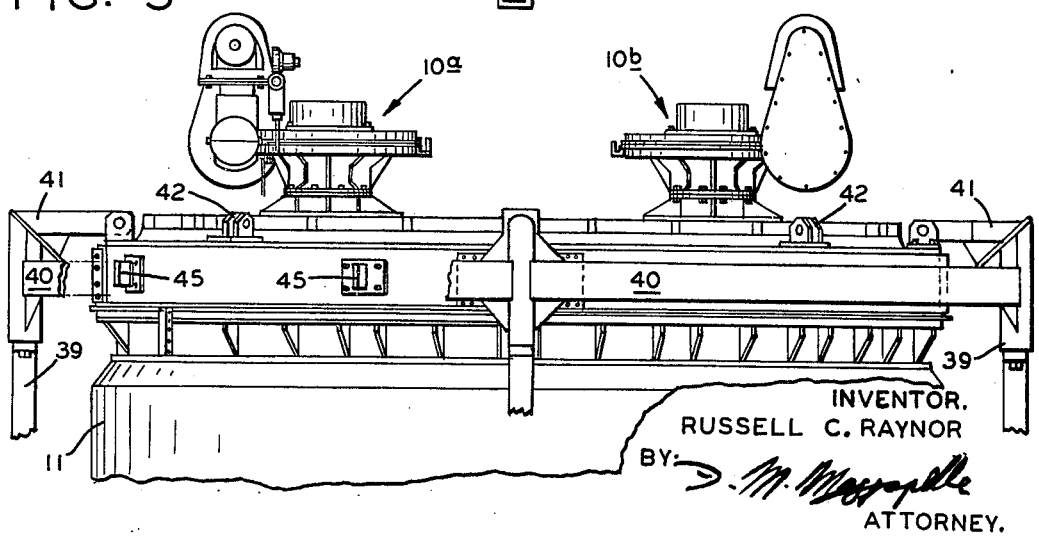
INVENTOR.
RUSSELL C. RAYNOR
BY: *D. M. Mazzelle*
ATTORNEY.

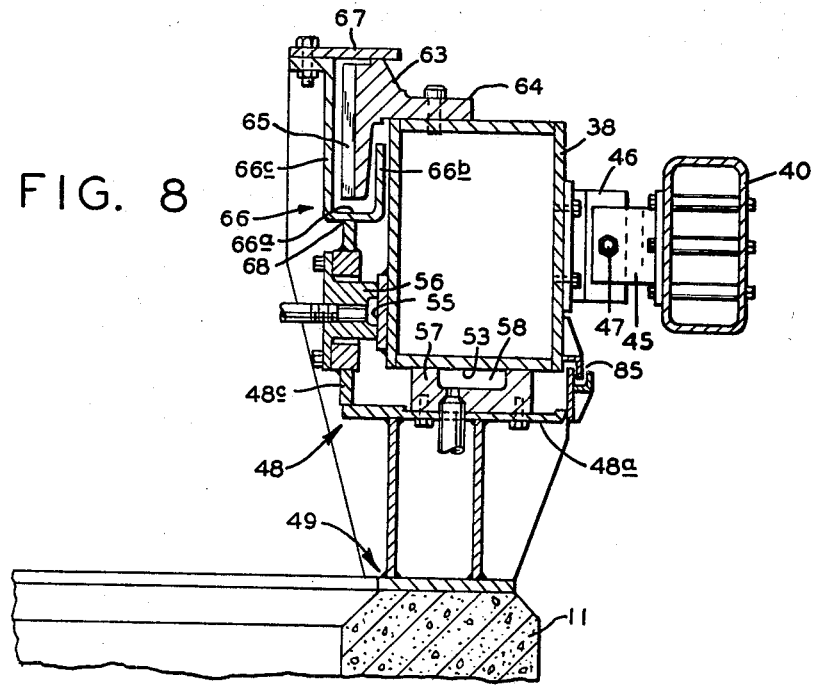
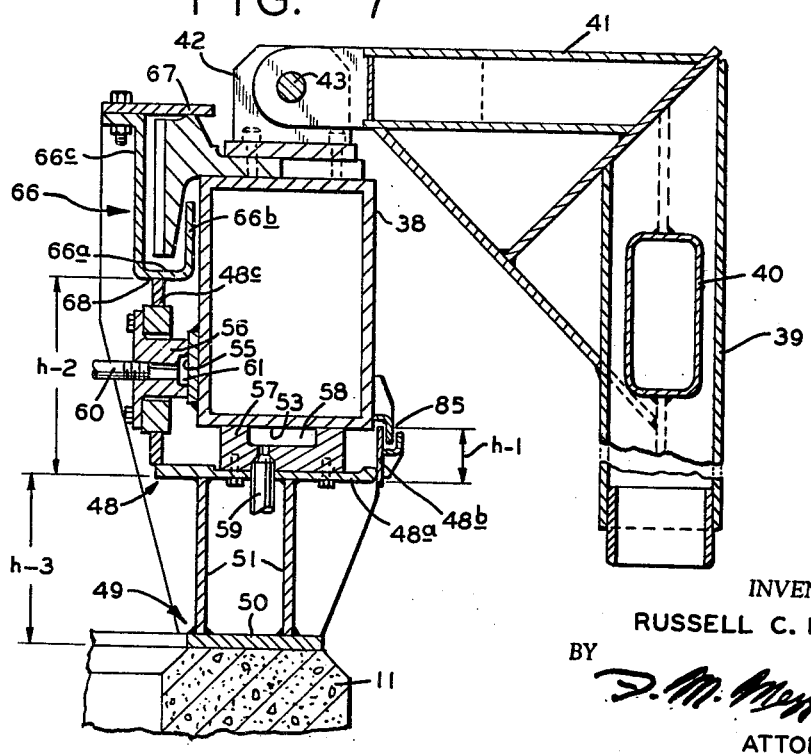

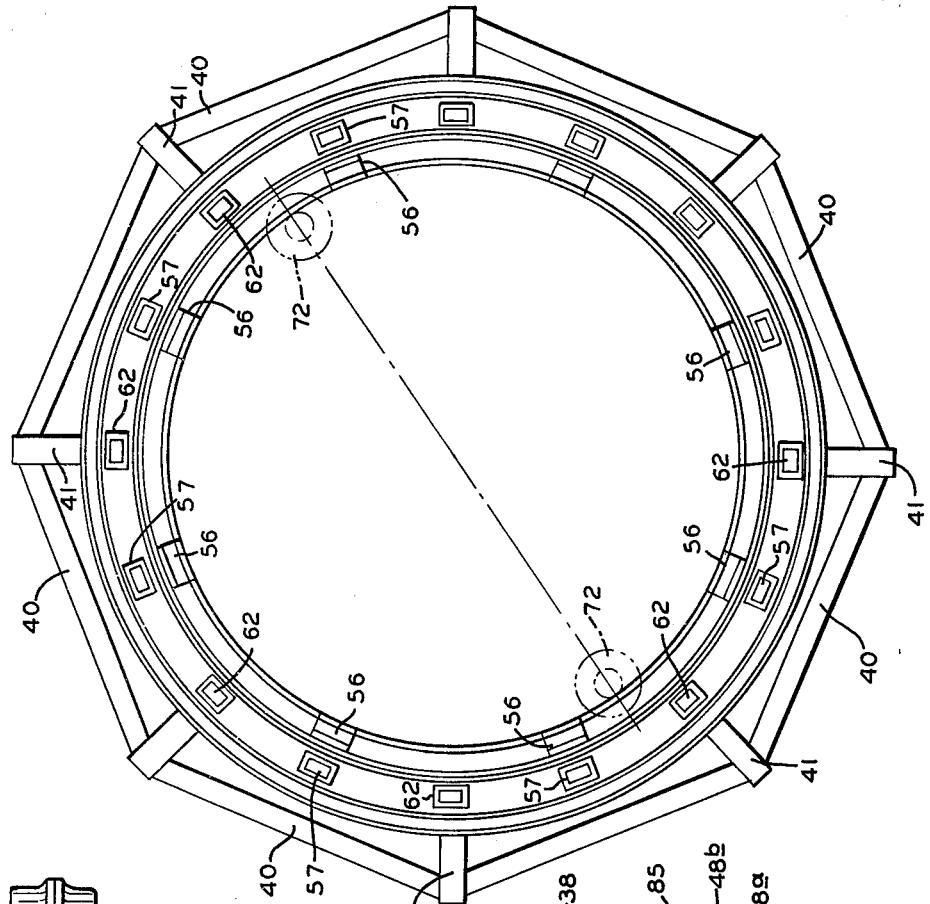
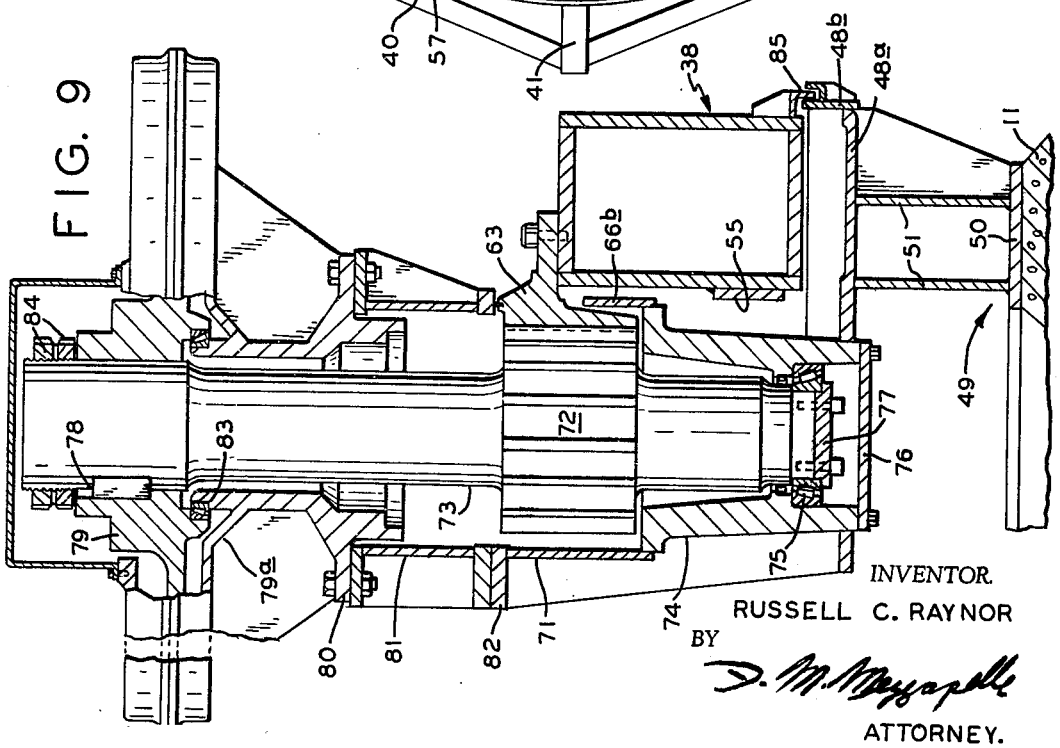

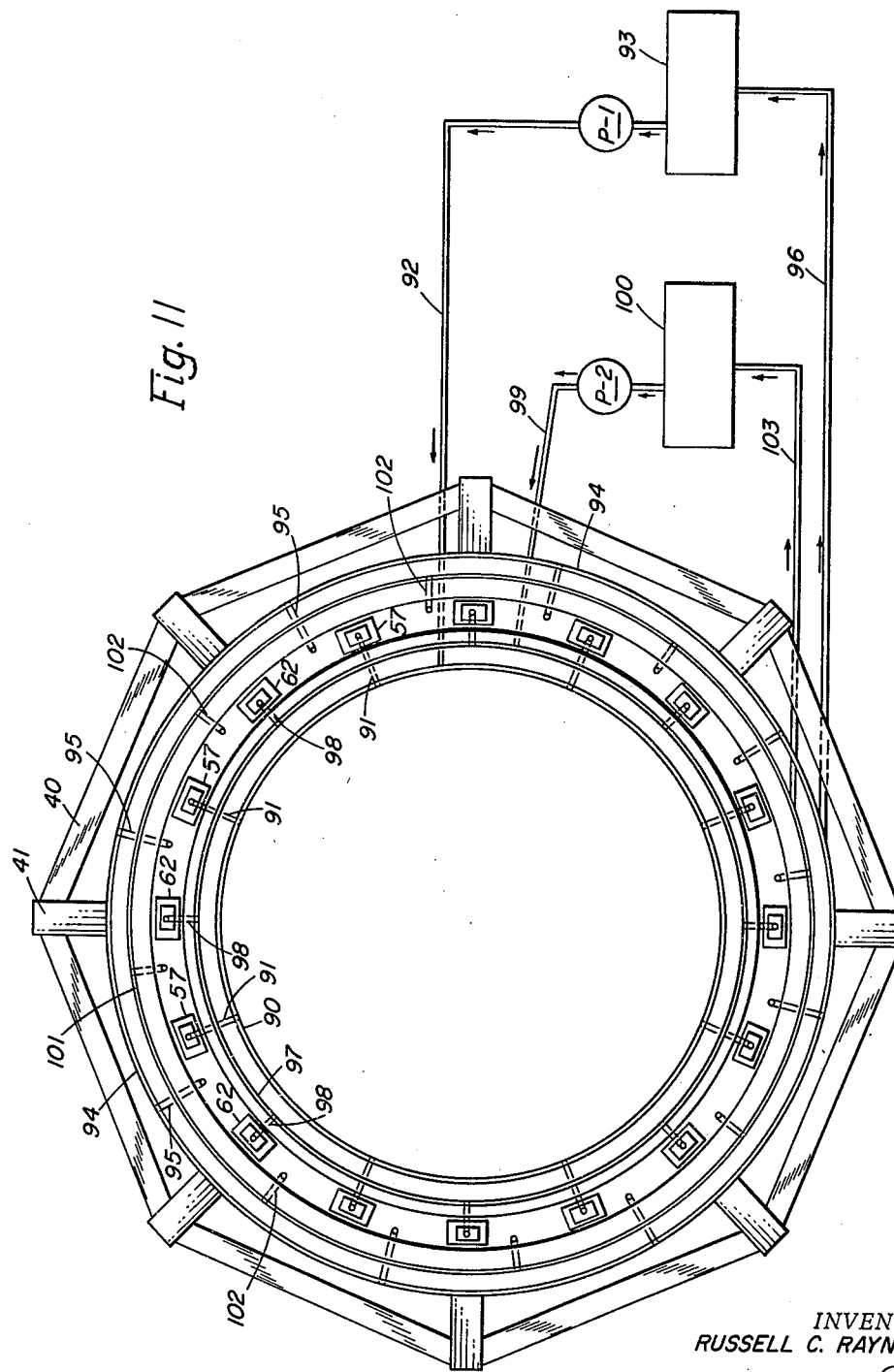

INVENTOR.
RUSSELL C. RAYNOR

BY Theodore M. Jablon
ATTORNEY

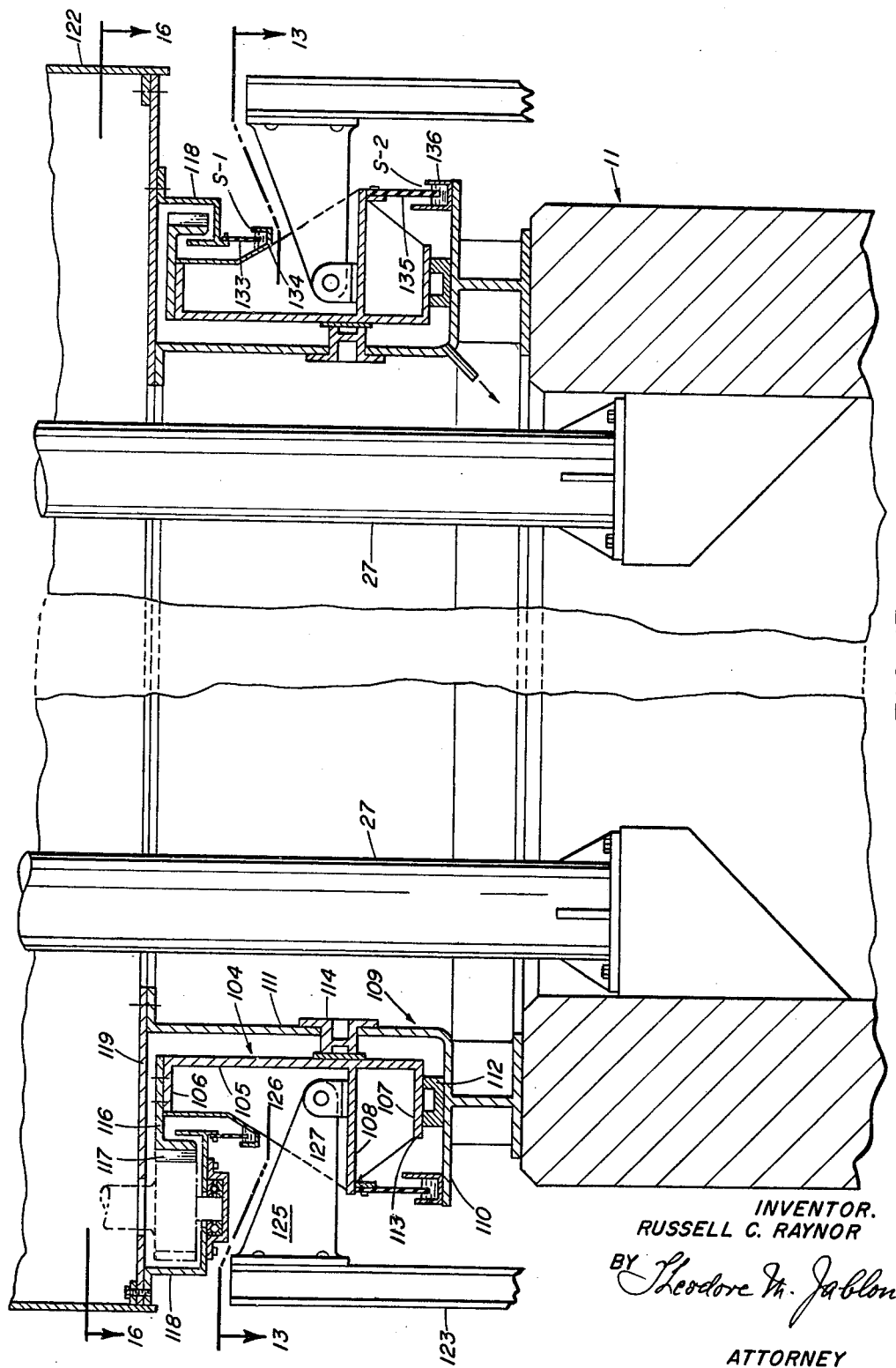

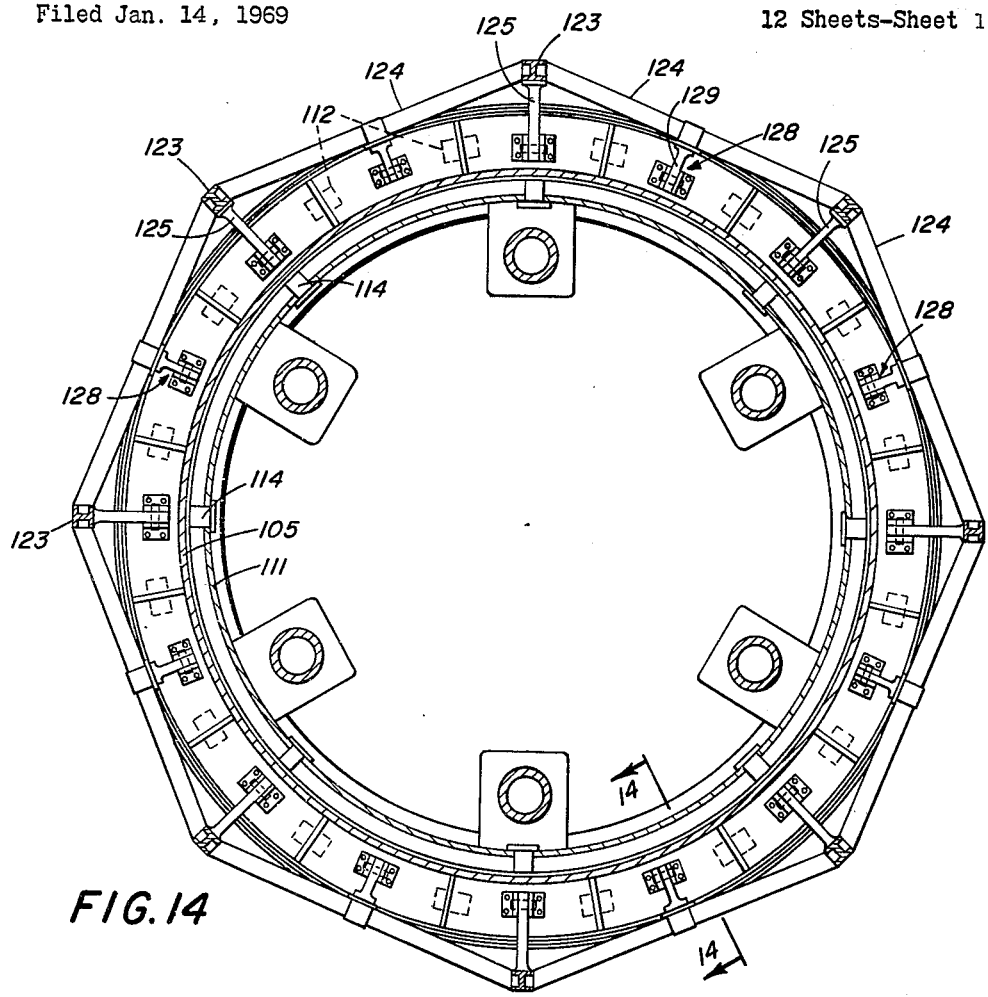
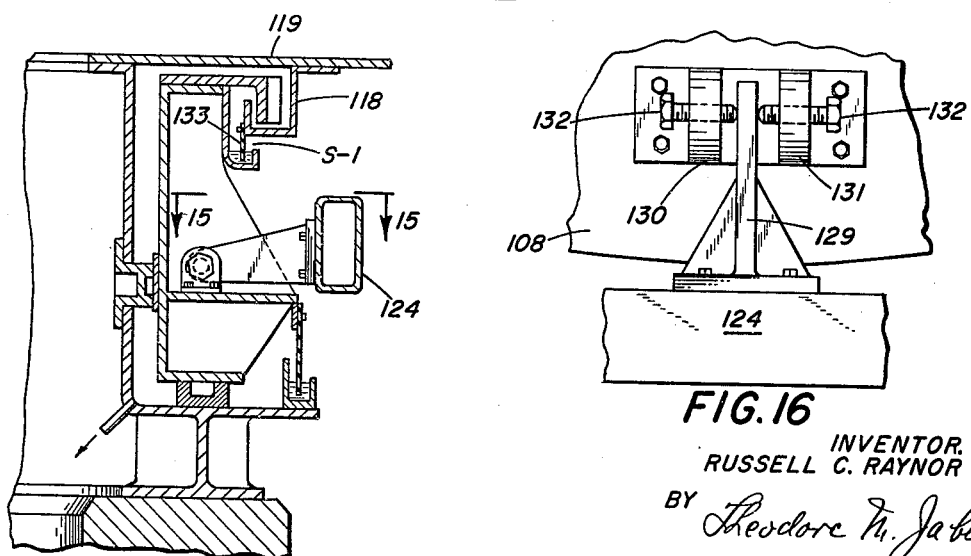

INVENTOR.
RUSSELL C. RAYNOR

BY Theodore M. Jablon

ATTORNEY

March 3, 1970 R. C. RAYNOR 3,498,468
SEDIMENTATION TANK
Filed Jan. 14, 1969 12 Sheets-Sheet 12

INVENTOR.
RUSSELL C. RAYNOR
BY Theodore M. Jablon
ATTORNEY

United States Patent Office 3,498,468
Patented Mar. 3, 1970

3,498,468
SEDIMENTATION TANK
Russell C. Raynor, South Salem, N.Y., assignor to Dorr-Oliver Incorporated, Stamford, Conn., a corporation of Delaware
Continuation-in-part of application Ser. No. 568,330, July 27, 1966. This application Jan. 14, 1969, Ser. No. 813,776
Int. Cl. B01d *21/06, 21/00*
U.S. Cl. 210—528                                                      46 Claims

ABSTRACT OF THE DISCLOSURE

A drive head supporting a rake structure for rotation upon a stationary support structure or column rising from the bottom of the sedimentation tank, whereas an annular bearing member carrying the rake structure is rotatable in an annular casing structure by way of verticle thrust and radial guide bearing means; and wherein a bull gear mounted on the annular bearing member has a separate annular lubricating trough carried by the casing structure.

---

This application is a continuation-in-part application of Ser. No. 568,330 filed July 27, 1966 and now abandoned.

This invention relates to continuously operating sedimentation tanks of the type wherein a drive head mounted on a stationary structure or pier rising from the tank bottom, supports a sediment engaging or sludge conveying structure for rotation about the pier. Usually, the drive head operates in such a manner as to convey sediment or sludge over the tank bottom to a zone of discharge or sump surrounding the foot end of the pier.

A conventional serviceable drive head now generally provided for pier-supported rake structures is shown in numerous prior art over a period of perhaps 25 years, a recent example being found in U.S. patent to Raynor No. 3,200,956.

The conventional drive head comprises an internally toothed bull gear connected to the rake structure, and supported upon a turntable base construction concentric with the vertical axis of rotation. An annular combination ball bearing concentric with the axis effective between the bull gear and the turntable base, supports the weight of the rake structure, while also providing radial bearing guidance against tilting forces.

More particularly, in the conventional or standard drive head, the stationary turntable base or bearing base construction is in the form of a generally annular casting which comprises an inner cylindrical portion flanged at the bottom for mounting on the pier, an annular horizontal platform portion or overhang extending outwardly from the top end of the cylindrical portion and an external annular trough portion depending from the periphery of the overhang concentric with the cylindrical portion. The depending trough portion accommodates therein the internally toothed portion of the bull gear as well as the combination ball bearing supporting the gear. The drive pinion of the drive gear unit is also accommodated in the trough portion, internally engaging the bull gear, while the drive unit itself is mounted on the overhang.

These standard ball bearing drive heads have served their purpose well over many years in sizes up to about 10 feet bearing diameter for sedimentation mechanisms in the order of, say, 100 to 300 ft. diameter. However, mechanical as well as manufacturing accuracy problems may develop in the combination ball bearing and in the gears, because of the problem in obtaining uniform bearing pressure stress distribution when the diameter of the combination ball bearing is increased to meet the demand for ever increasing thickener mechanism sizes which may be in the order of 300 to 600 ft.

It is one of the objects of this invention to provide an improved drive head wherein the aforementioned problems and limitations are eliminated irrespective of increases in the diameter of the bearing beyond that heretofore considered practical in conventional constructions, is reliable, and has great resistance to wear and less critical to control of dimensional tolerances.

Another object is to provide an improved drive head of generally annular shape, having great stability as well as load carrying capacity, and which is compact in the sense that it surrounds a maximum of free area relative to a minimum of outside overall dimensions. Such a drive head should lend itself advantageously for mounting on the top end of a cylindrical hollow pier providing operating space therein containing apparatus for sludge withdrawal from a low point of sludge collection upwardly through the hollow pier.

The foregoing objectives are attainable by the provision of an improved drive head wherein an annular bearing member is connected to the top end of the rake structure to rotate upon an antifriction thrust bearing arrangement concentric therewith, sustaining the weight of the rake structure, as well as counteracting overturning forces resulting from unbalanced loads on the rake structure. Separate radial antifriction guide bearing means are effective upon the annular member to provide operational concentricity.

Both bearing means are contained in a primary annular trough structure the bottom of which may be supported upon the top end of a hollow pier. A bull gear is shaped, and mounted concentrically atop the annular bearing member, in such a manner that a toothed portion of the gear member depends into or lodges in a secondary annular trough structure for lubrication. This secondary trough, as well as pinion drive means associated therewith are in turn connected to and supported by the primary trough structure, with the drive pinion engaging the bull gear in the secondary trough for lubrication.

The weight supporting bearing means in the primary trough structure may be in the form of a set or system of horizontal stationary hydrostatic pressure pads spaced around the axis of rotation. These pads cooperate with a prepared annular bottom face of the annular member to floatingly support the same and the rake structure in a horizontal plane by pressure oil supplied to the pads.

The radical bearing means also may be in the form of hydrostatic pressure bearing pads, herein termed the verticle pads, shaped to cooperate with a prepared cylindrical surface presented by the annular member. Spent pressure operating oil from both the vertical and the horizontal pads collects in the primary trough structure, and is delivered therefrom for re-pressurizing and re-use.

Preferably, a plurality of pinion drive units are provided equally spaced from one another, and interbalanced so that the total torque load for moving the rake structure is equally distributed among these units. In this way, the annular member with the rake structure is floatingly centered in a horizontal plane, affording optimum gear meshing engagement and minimizing wear and tear.

The rotary bearing member operating in an annular casing structure atop the center column, may have mounted upon it either an internally toothed bull gear having an annular lubricating trough along the inner periphery of the casing structure, or an externally toothed bull gear having an annular lubricating trough along the outer periphery of the casing structure but supported from the inner upstanding wall of the casing structure.

Specific structural features are found in the provision and special arrangement of annular sealing means concentric with the vertical axis of rotation of the rake structure, for the protection of the bull gear and of the bearings; and in the manner of connecting the annular bearing member to the central cage portion of the rake structure, providing separate weight supporting and torque transmitting means.

Another feature lies in the advantageous combination of the improved drive head including a plurality of interbalanced pinion drive units with a hollow supporting pier containing apparatus for direct upward sludge withdrawal, and with a column construction rising from within the pier to support a radial bridge as well as hoisting means serving the operating space surrounded by the annular drive head on the pier.

Still other features lie in the provision of a safety system of horizontal hydrostatic pressure bearing pads, comprising two sets of such pads operable in alternation.

Other features and advantages will hereinafter appear.

FIG. 1 is a semi-diagrammatic vertical sectional view of a large thickener embodying the invention, wherein the rake structure is supported upon, and revolves about a hollow center pier construction.

FIG. 2 shows the thickener of FIG. 1, more fully implemented.

FIG. 3 is a plan view of the thickener taken on line 3—3 in FIG. 2.

FIG. 5 is a further enlarged side view of a preferred embodiment of the drive head per se including a pair of pinion drive units, mounted on a hollow pier.

FIG. 6 is a cross-sectional view taken on line 6—6 in FIG. 4, showing the drive head from the top and a polygonal cage portion of the rake structure surrounding it.

FIG. 7 is a detailed vertical sectional view of the drive head taken on line 7—7 in FIG. 6, showing details of construction featuring an annular bearing member of box-shaped profile connected to the rake structure as well as to a bull gear, with hydrostatic pressure pads antifrictionally supporting it.

FIG. 8 is a similar detail vertical sectional view taken on line 8—8 in FIG. 6, showing additional details of construction.

FIG. 9 is still another detail vertical sectional view taken on line 9—9 in FIG. 6, including a pinion drive unit engaging the bull gear.

FIG. 10 is a diagrammatic top view of the drive head surrounded by the cage portion of the rake structure, diagrammatically showing the system of hydrostatic pressure bearing pads, related to a plurality of the drive units.

FIG. 11 is similar to FIG. 10, diagrammatically illustrating the operation of a dual hydrostatic pad system.

FIG. 13 is a greatly enlarged vertical sectional view of the drive head construction featuring an externally toothed bull gear mounted on a rotary annular bearing member of E-shaped profile.

FIG. 14 is a cross-sectional view of the drive head taken on line 14—14 in FIG. 13, showing the support and torque transmitting connections of the rake structure with the annular bearing member.

FIG. 15 is an enlarged detail sectional view of the drive head taken on line 15—15 in FIG. 14.

FIG. 16 is a detail cross-sectional view taken on line 16—16 in FIG. 15 showing details of the torque transmitting connections.

Figure 4:
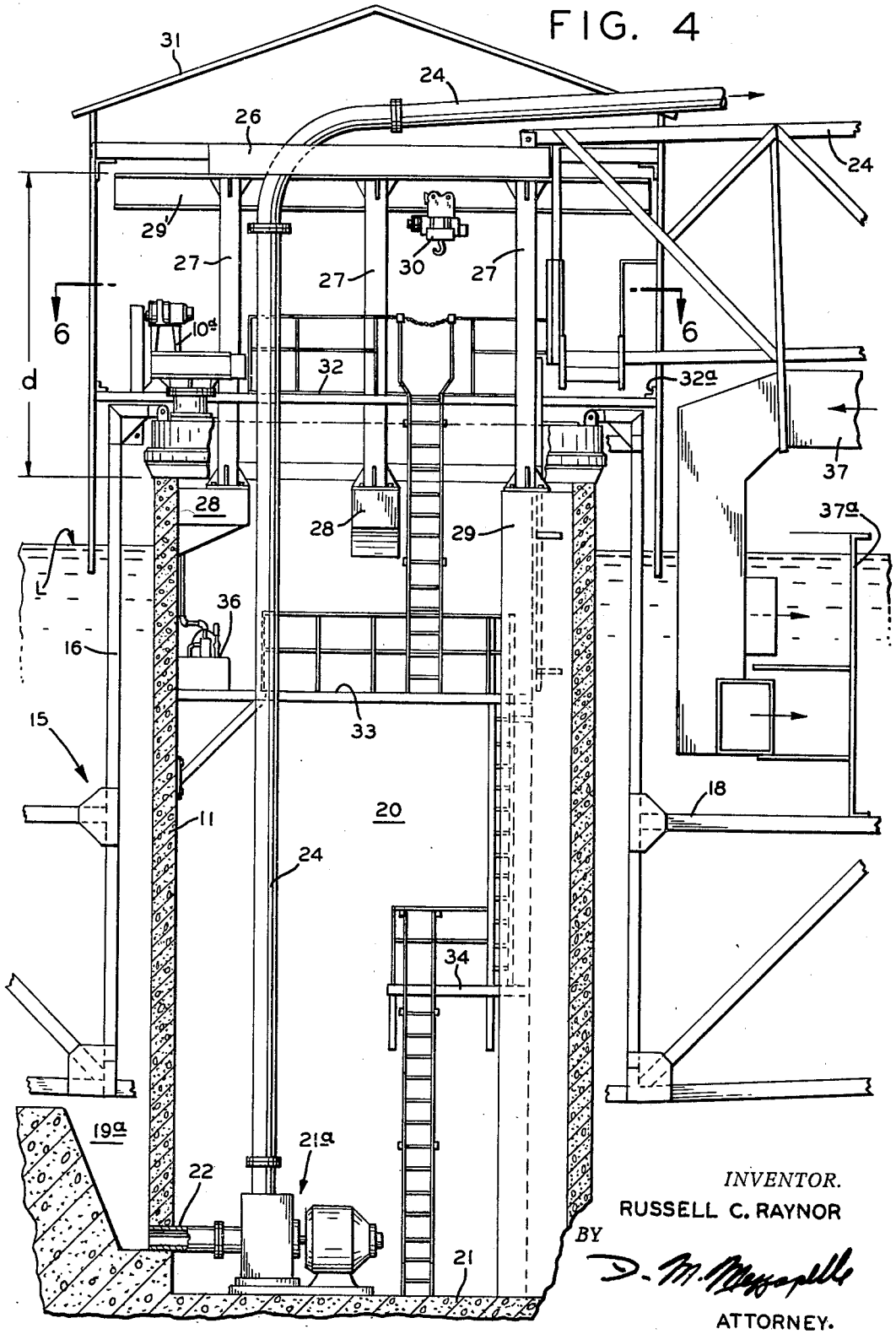
FIG. 4 is a greatly enlarged vertical sectional view of the center pier construction, including the novel drive head for the rake structure, as well as sediment pumping apparatus and other equipment and structure associated with the pier.

The improved drive head of this invention may be embodied in a continuously operating thickener of the type illustrated in FIGS. 1, 2, 3. Accordingly, the drive head 10 of generally ring shaped construction is mounted compactly upon and concentric with the top end of a cylindrical hollow pier 11 which rises centrally from the bottom 12 of a settling tank. The peripheral wall 13 of the tank is provided with the usual overflow launder 14. The drive head in this embodiment has a pair of torque-interbalanced pinion drive units 10a and 10b to be furthermore described below.

The sediment engaging rake structure 15 comprises a central cage portion 16 surrounding the pier supported from the drive head for rotation, and rake arms 18 in the form of truss structures provided with inclined sediment engaging raking blades 19. Rotation of the rake structure by the operation of the drive head cause the blades to convey the sediment or sludge over the tank bottom to an annular collecting zone or sump 19a surrounding the foot end of the pier.

Referring also to FIG. 4, an ample operating space or operating pit 20 is provided within the caisson type or hollow pier, accessible through the wide open area surrounded by the annular shape of the improved and compact drive head construction of this invention. The pit has a floor 21 low enough to enable motor driven pumping apparatus 21a mounted on this floor to draw collected sludge from the sump through intake conduit 22 for delivery through a discharge pipe 24 extending first upwardly in the pit and then horizontally over a stationary bridge 25 of truss construction extending from the pier to the peripheral wall of the tank. The inner end of the bridge structure is supported upon a raised horizontal frame 26 rigidly interconnecting the upper ends of a number of vertical support members or columns 27 rising from the pit through the open area surrounded by the drive head. The support columns are mounted on brackets 28 or vertical foundations 29 extending inwardly from the concrete wall of the pier, a suitable arrangement of the support columns 27 being shown in FIGS. 3 and 6.

Supported from the raised frame 26 at the underside thereof is a beam 29 with projecting end portions, providing a horizontal track for a dolly or travelling hoist 30 for servicing the pit or transferring loads between the bridge structure and the pit. Frame 26 and the columns also support a protective hood or housing 31 surrounding the drive head and the upper portion of the pier. An upper working platform 32 supported by the housing as at 32a and/or by the columns 27, is accessible from the bridge and is located at a level such as to allow for servicing the pinion drive units 10a and 10b.

Additionally provided within the pit are an intermediate platform 33 and a lower platform 34 with ladders interconnecting them and leading down to the floor of the pit. Mounted upon the lower platform 33 is a recirculating pump aggregate 36 for delivering oil under pressure sufficient to operate a system of hydrostatic bearing pads, embodied in a preferred form of the improved drive head of this invention, and furthermore to be described below.

A supply conduit 37 for feed slurry is suspended from the underside of the bridge, leading from the tank wall into an annular feed well 37a supported on the rake arms and roasting therewith concentric with the pier. L designates the overflow level of the liquid undergoing sedimentation in the tank.

As illustrated in more detail in the further enlarged views and sections of FIGS. 5 to 9 and also in the diagrammatic plan view of FIG. 10, a preferred embodiment of the drive head comprises a rotary annular bearing member 38 of box-shaped cross-sectional configuration. This bearing member supports the weight of the rake structure in torque transmitting relationship therewith.

In this connection it will be noted that the cage portion of the rake structure is of polygonal or preferably octagonal cross-sectional configuration (see FIG. 6). Vertical cage members 39 constitute the corners of the polygonal shape, while horizontal members 40 interconnecting respective vertical members at the top represent the eight sides of the octagonal shape.

The end of the polygonal cage portion surrounds the annual bearing member so that the horizontal connecting members 40 extend substantially tangential to said annual member. The weight of the rake structure rests upon the annular member through a set of weight supporting connections between the annular member 38 and the vertical members 39, whereas torque is transmitted through a separate set of torque transmitting devices 44 alternating with the weight supporting connections, and adjustably effective between the bearing member and the horizontal members 40 and located midway between respective vertical members.

Accordingly, for weight support (see FIGS. 5, 6 and 7), the cage member is provided with radial arms or members 41 extending rigidly inwardly from the top ends of respective vertical members 39, so that the inner ends of these radial members and thus the weight of the rake structure may be supported upon the top of the annular bearing member. The connection itself is provided by brackets or socket members 42 mounted atop the annular member, and whereby the respective radial members 41 are held in position by means of horizontal securing pins 43. It is notable in this embodiment that the weight load from the rake structure is thus transmitted through the annular bearing member vertically directly downwardly to the pier.

Besides, there are the torque transmitting devices 44 (see FIGS. 5, 6 and 8) each of which comprises a pair of cooperating lugs 45 and 46 provided respectively upon the annular member and the respective adjacent horizontal member 40, with adjusting means, for instance as set screw 47 adjustable so as to be effective between the cooperating lugs in such a manner that equal torque forces, i.e. equal portions of the total driving torque, may be transmitted through these set screws from the bearing member 38 to the rake structure. The set screws then act as adjustable abutment means.

The annular bearing member 38 is mounted for rotation in what is herein termed a primary annular trough structure 48 having an annular flat bottom portion 48a, an outer cylindrical wall 48b of a height $h-1$, and an inner cylindrical wall 48c of substantially greater height $h-2$. This trough structure is mounted concentrically upon the annular top face of the hollow pier by means of a footing 49 which may comprise a horizontal annular anchoring flange 50 spaced a distance $h-3$ downwardly from the bottom of the trough structure and rigidly connected thereto as by means of concentric cylindrical web portions 51 or the like. The trough structure including the footing may be fabricated as an all-welded construction with the component parts welded together substantially as shown.

For rotatably supporting the annular bearing member 38 and the weight of the rake structure, the trough structure 48 is provided with antifriction thrust bearing means effective between the bottom portion 48a and a prepared annular bottom face or track 53 on the bearing member, and furthermore with radial antifriction bearing means effective beween the inner wall of the trough structure and a prepared inner cylindrical face or track 55 on the bearing member. Both the thrust bearing and the radial bearing means are preferably in the form of hydrostatic pressure bearing pads spaced evenly from one another about the vertical axis of rotation of the rake structure, and operated with pressure oil supplied from the aforementioned recirculating pump aggregate 36.

Accordingly, for radial guidance there is provided a set of vertical hydrostatic pressure bearing pads or cups 56 mounted in the inner cylindrical wall 48c, each pad having a prepared arcuate vertical face conforming to the associated cylindrical face 55 of the annular member. A set of horizontal hydrostatic pressure bearing pads or cups 57 is mounted on the annular bottom portion 48a, which pads have prepared horizontal top faces all extending in the identical horizontal plane. The operation of hydrostatic pressure bearing pads per se including oil pressure controls associated with the pads, is well known and need not here be detailed. Suffice it to say that the oil is forced into a recess 58 in the horizontal pressure pads, as indicated by a supply pipe 59 connected to each pad.

The operating oil is supplied and kept at a pressure high enough for continually forcing in between the pressure pads and the underside of the bearing member films or layers of oil effective of themselves to floatingly support the annular bearing member for rotation in a horizontal plane. The vertical hydrostatic pads maintain radial guidance as pressure oil is forced through respective supply pipes 60 into the recess 61 of each pad, and then through a radial clearance or tolerance provided between the pads and the associated cylindrical face of the bearing member. In this way, the annular member 38 and the rake structure are supported and guided by the forcible interposed films of oil, avoiding the use of any mechanical moving antifriction means such as the aforementioned conventional combination ball bearing construction, and thereby avoiding certain limitations in drive head design and operation.

Referring to the diagrammatic layout of the hydrostatic bearing pad arrangement in FIG. 10, it will be seen that it provides a second set of horizontal hydrostatic bearing pads 62 disposed in alternation with the bearing pads 57, both sets having their horizontal top faces aligned in the identical horizontal plane. Each set will have its own oil pressure supply and control system such as exemplified at 36, so that the two sets may be operated in alternation, preferably in such a manner that there is a slight overlap at the point of change-over so that the rotation of the rake structure need not be stopped. A periodic changeover between the two sets of bearing pads may be effected by hand or automatically. Also, the rotation of the rake structure may be stopped automatically in case of stoppage of the oil pressure supply or in case of overload on the rakes. Also, in case of stoppage of the pressure oil supply for one system, the parallel system may take over. One system may be overhauled while the other is in operation.

A dual pressure oil operating system is more clearly although diagrammatically illustrated in FIG. 11 resembling the general layout of FIG. 10. In this example, one set of hydrostatic bearing pads 57 is served by an annular supply header 90 having supply branches 91 delivering pressure oil to the respective pads. The header receives the pressure oil through a supply pipe 92 connected to the delivery end of a pump P–1 which draws the oil from a spent oil receiver tank 93. Spent operating oil from this set of pads 57 drains into an annular collecting header 94 through respective branch pipes 95, and then through pipe 96 into the receiver tank 93.

Similarly, the other set of hydrostatic bearing pads 62 is served by an annular supply header 97 having individual branches 98 delivering pressure oil to the respective pads 62. This header receives the pressure oil through a supply pipe 99 connected to the delivery end of a pump P–2 drawing the oil from a spent oil receiving tank 100.

Spent operating oil from this set of pads 62 drains into an annular collecting header 101 through respective branch pipes 102, and then through pipe 103 into the receiver tank 100.

For rotating the rake structure, the preferred embodiment provides an internally toothed ring gear or bull gear member 63 having an outwardly directed horizontal flange 64 whereby it is mounted flat upon the top face of the rotary annular bearing member, the depending internally toothed portion 65 of the gear being located substantially directly above the inner cylindrical wall 48c and above the radially effective hydrostatic bearing pads therein. The depending toothed portion concentric with the bearing member lodges in what is herein termed a secondary annular trough structure 66 providing therein a bath of lubricating oil for the gear. This secondary trough structure has an annular bottom 66a, a low outer wall 66b, and a high inner wall 66c to which is bolted at the top an annular cover plate 67 for the gear. The secondary trough structure 66 is supported by the primary trough structure 48 which in turn is supported upon the pier. Preferably, the secondary trough structure is welded as at 68 directly to the top edge of wall 48c. The secondary trough structure 66 in turn supports and has mounted thereon a pair of self-contained drive units 10a and 10b (see FIGS. 5, 6, and 9) equipped with means for applying a balanced drive torque to the gear, to be furthermore explained. For the purpose, the secondary trough structure is formed with a corresponding pair of pockets 71 constructed and arranged to accommodate respective drive pinions 72 and pinion shafts 73. These pockets (see FIG. 9) comprise a substantially cylindrical member or downward extension 74 depending from the bottom of the secondary trough structure 66, and containing a conical roller bearing 75 for the lower end of the respective pinion shaft.

The depending pocket member 74 merges laterally with the adjoining wall 48c of the primary trough structure, and has bottom closure plate 76 removable for access to the bearing 75 which in turn is held in place by removable retainer plate 77. With an adequate oil level maintained in lubricating trough 66, the pockets accommodating the pinion shafts will thus always be filled with lubricating oil.

The upper end of the pinion shaft has torque transmitting connection 78 with the worm gear 79 of a worm gear drive contained in a housing structure 79a which has a bottom flange 80 bolted to a cylindrical neck or spacer member 81 which in turn is bolted to the top flange 82 of the secondary or lubricating trough 66.

The worm gear and thus the upper end of the pinion shaft, are supported and guided in a conical roller bearing 83 effective between the housing 79a and the gear, the assembly being held together by a pair of lock nuts 84 threaded onto the top end of the pinion shaft and adjusted for proper operation of the conical roller bearings 75 and 83.

In this embodiment each of the pinion drive units is self-contained with its own drive motor. However, these units are operatively interconnected by way of torque balancing means which cause the drive units to assume equal shares of the total driving torque required for the rotation of the rake structure.

Such torque balancing means may be in the nature of the hydraulic balancing system disclosed in U.S. patent application of Widdrington Ser. No. 310,542, filed Sept. 23, 1963 (now Patent No. 3,252,349). In that patent, a closed hydraulic pressure system through interconnecting piping interbalances the axial reaction forces of the worm shafts in the respective worm drive units. As applied to the present embodiment, the interbalancing piping can be arranged without crossing or obstructing the open area of the operating pit in the pier, and leaving the area free for access and for the operation of the aforementioned hoisting means above.

In this connection it may be noted that, with the hydrostatic bearing pads effective to support the annular bearing member 38 and the rake structure floatingly in a horizontal plane, the operation of the torque-balanced pinion drive units will tend to keep the bearing member centered relative to the theoretical vertical axis of rotation, thus maintaining optimum tooth engagement of the drive pinions with the gear, while minimizing wear and tear.

However, it should also be understood that more than two, and preferably three, self-contained pinion drive units may be employed uniformly spaced from one another and hydraulically torque-balanced in the manner pointed out above.

Wherever necessary annular dust seals are provided on the drive head between the rotating and the stationary parts, one such seal 85 extending along the periphery of the primary trough structure 48.

From the foregoing disclosure and description it will be seen that the invention provides an improved drive head for a pier-supported rake structure, eliminating various aforementioned limitations inherent in the prior art, while affording design possibilities and advantages which could heretofore not be realized.

To summarize, the novel drive head has the annular bearing member rotatable in the annular casing structure the footing of which may be mounted or anchored on the caisson type hollow pier defining an operating pit for upward withdrawal therethrough of the collected sludge. An annular trough structure connected to and supported by the casing structure serves as an oil lubricating trough for a ring gear or bull gear member mounted on the annular bearing member. The casing structure supports drive mechanism for the bull gear, which mechanism may be in the form of a pair torque balanced pinion drive units.

Various other embodiments of the invention are shown in the drive head constructions of FIGS. 11 to 22.

The drive head construction according to FIGS. 11 to 16 embodies the concept of the rotary annular bearing member connected to the rake structure and mounted for rotation in an annular casing structure by way of vertical thrust bearing means and radial guide bearing means, the casing providing a separate annular lubricating trough for the bull gear carried by the annular bearing member.

In this embodiment, a rotary annular bearing member 104 is of E-shaped profile or cross-sectional configuration. This annular bearing member therefore comprises a vertical cylindrical body portion 105, an outwardly directed horizontal top flange 106, an outwardly directed bottom flange 107 parallel to the top flange, and an outwardly directed annular shelf 108 extending in a horizontal plane intermediate the planes of the top and bottom flanges.

This annular bearing member together with rake structure 15 is rotatable in an annular casing structure 109 mounted atop hollow center pier 11. The casing structure has an annular horizontal bottom portion 110 and an upstanding inner wall portion 111. Vertical thrust bearing means 112 which may be in the form of hydrostatic bearing pads previously described in bearing engagement with the horizontal annular bottom track face 113 of the bearing member. Radial guide bearing means 114 here also shown to be hydrostatic bearing pads, have bearing engagement with the inner cylindrical track face 115 of the rotary bearing member.

An externally toothed bull gear 116 is mounted on the top flange of the rotary bearing member, the toothed portion 117 of the gear depending into an annular lubricating trough 118 supported from an annular platform structure 119 mounted upon and supported by the top end of the casing structure, and extending outwardly therefrom. The platform structure 119 also supports interbalanced pinion drive units 120 and 121 (see FIG. 16) imparting drive torque to the bull gear and the rake structure. A protective hood or housing 122 may also be supported by this platform structure.

The central upright cage portion of the rake structure (see FIGS. 12 and 13) is of octagonal configuration surrounding the center pier. This cage comprises vertical corner members 123 suitably and rigidly connected to one another by cross members and diagonals, as well as by horizontal tie members 124 at the top.

The top end of each vertical corner member has rigidly connected therewith a radially inwardly directed arm 125, which arms serve in supporting the weight of the rake structure upon the annular bearing member, through pins 126 in brackets 127 mounted upon the intermediate annular shelf 108 of the bearing member.

Effective between the annular bearing member 104 and the horizontal tie members 124 of the cage are separate torque transmitting devices 128 for rotating the rake structure. Accordingly (see FIGS. 13, 14, 15) each torque transmitting device located midway between the ends of a respective horizontal tie member 124, comprises a torque receiving arm 129 rigidly connected to the tie member and extending radially inwardly therefrom and into torque transmitting engagement with one of two adjacent torque-imparting lugs 130 and 131 fixed upon the shelf of the bearing member. Set screws 132 in these lugs are adjustable so that the driving torque from the drive units may be distributed evenly between all the torque transmitting devices in either direction of rotation.

An upper annular sealing device S–1 above the shelf comprises a skirt 133 depending from trough 118 and into contact with a sealing liquid or oil contained in an annular sealing trough 134 rotating with the annular bearing member concentric therewith. A lower annular sealing device S–2 below the shelf comprises a skirt 135 depending from the outer peripheral edge of the shelf into sealing contact with a sealing liquid or oil contained in an annular sealing trough 136 connected to the bottom portion of the casing structure concentric therewith.

Figure 12:
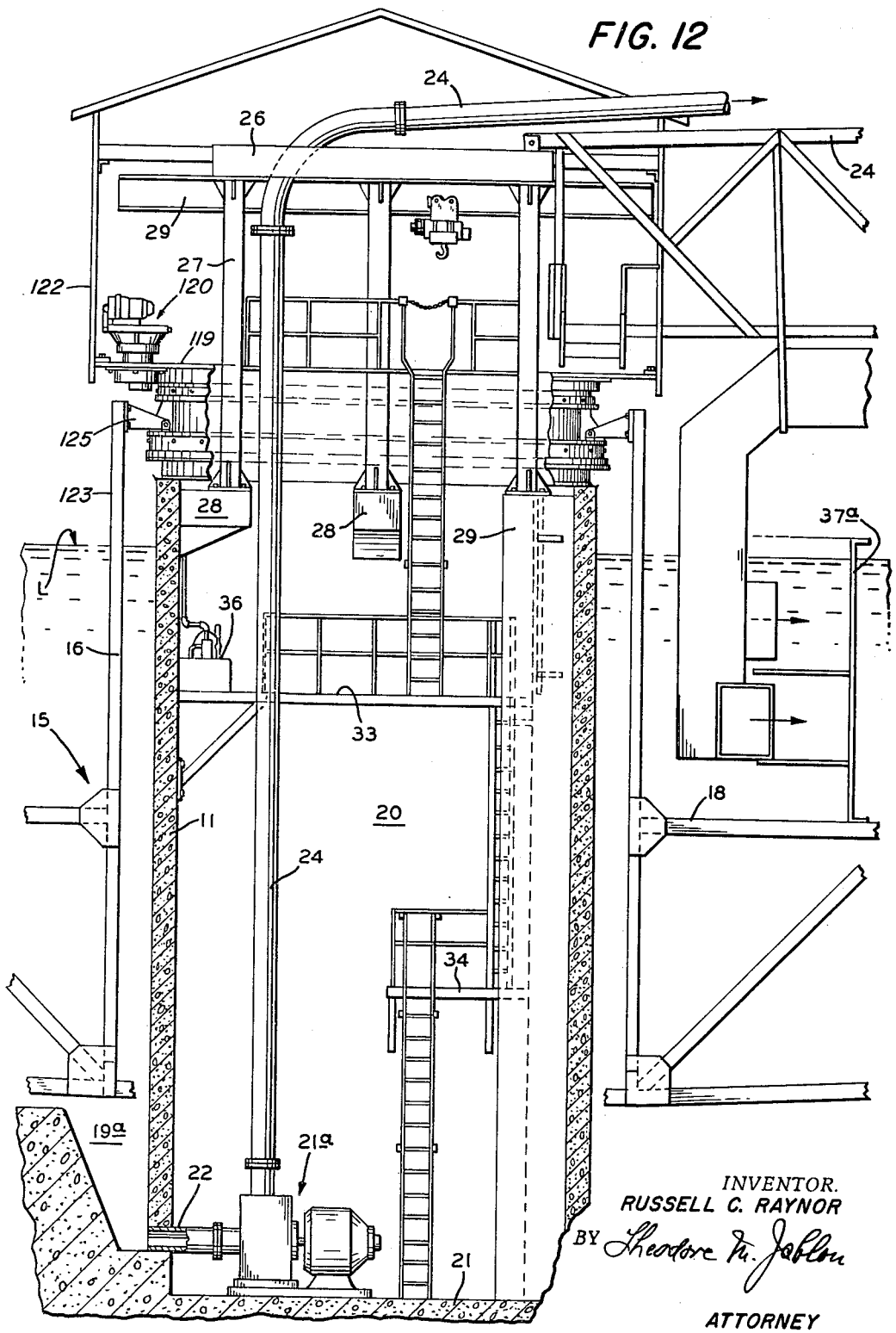
FIG. 12 is a vertical sectional view of the center pier, similar to FIG. 4, except for a modified construction of the drive head embodying the invention.
Figure 17:
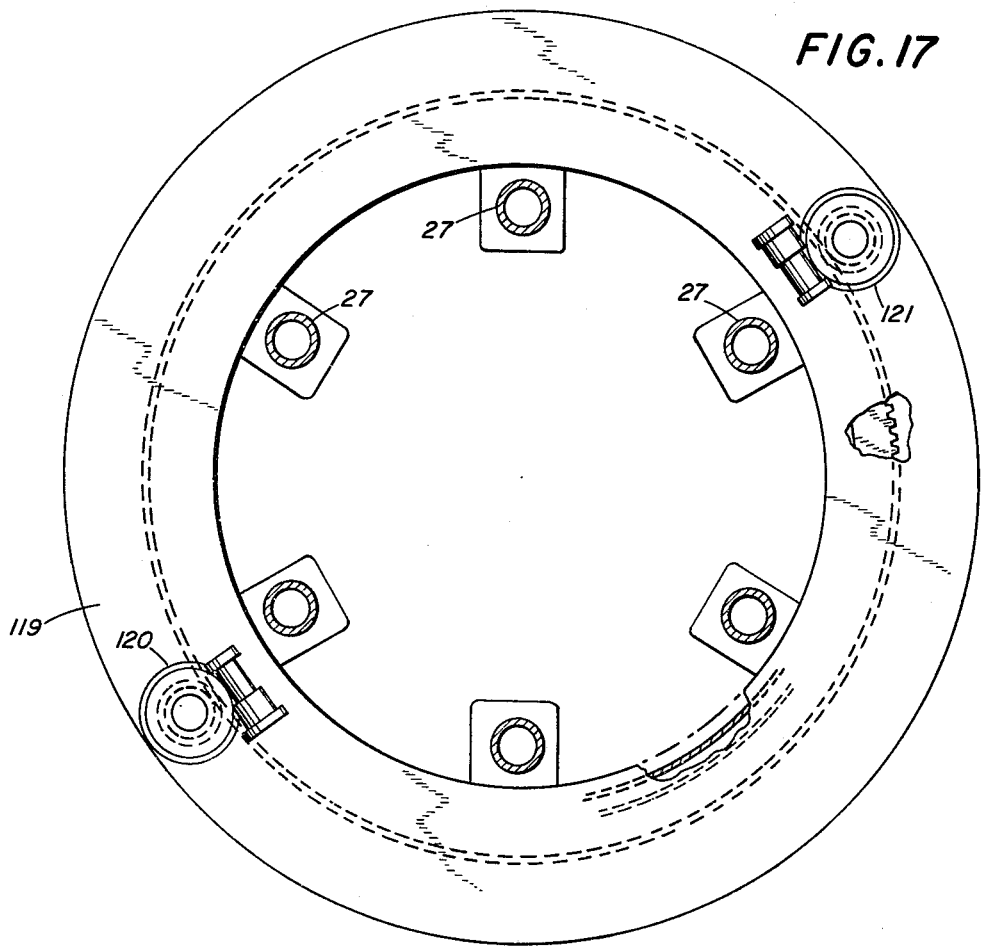
FIG. 17 is a cross-sectional view taken on line 17—17 in FIG. 12, showing an annular platform structure of the drive head, with a plurality of drive heads supported thereby.

The embodiment in FIG. 17 differs from that in FIG. 12 insofar as the radial hydrostatic bearings are replaced by a suitable roller bearing unit 137 adjustable relative to the rotary bearing member by slight movement or tapping up or downwardly along sloping face F provided upon upstanding inner wall of the casing structure. This also features a differently arranged annular collecting trough 138 for spent operating oil from the hydrostatic vertical thrust bearing pads 139. This collecting trough is depressed relative to the bottom of the casing structure, so that when a sealing skirt 139 is detached, the hydrostatic bearing pads or other vertical thrust bearing devices became accessible and observable. The sealing skirt depends from the rotary bearing member into contact with sealing oil contained in an annular sealing trough 140 surrounding and connected to the depressed annular collecting trough 138.

Figure 18:
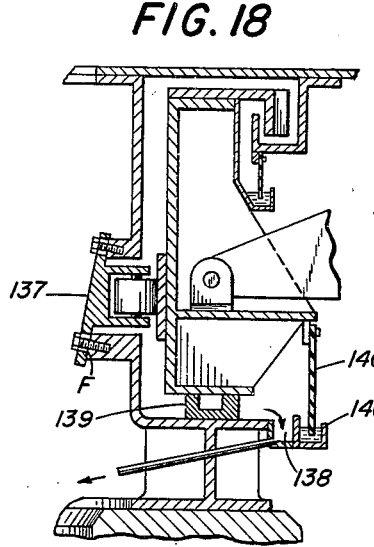
FIGS. 18 to 23 are vertical sectional detail views showing modifications of the drive head structures embodying the invention.
Figure 19:
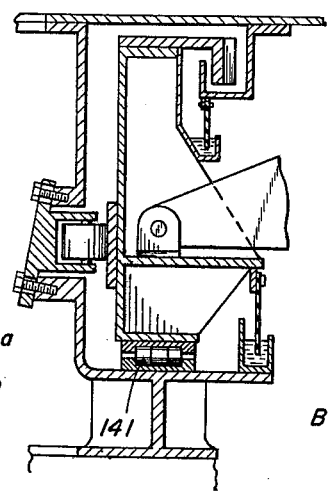

The embodiment in FIG. 18 differs from that in FIG. 17, in that the horizontal hydrostatic bearing pads also are replaced by mechanical bearing means such as the annular vertical thrust roller bearing 141.

The embodiment in FIG. 18 differs from that in FIG. 12, by the provision of an internally toothed bull gear 142 having an annular lubricating trough 143 embodied in the upstanding inner wall of the casing structure. An upper annular sealing device S–3 has a sealing skirt 144 depending from a platform or the like carried by the top end of the casing structure and depending into an oil-filled annular sealing trough 144a rotating with the annular bearing structure. A lower sealing device is designated S–4.

Figure 20:
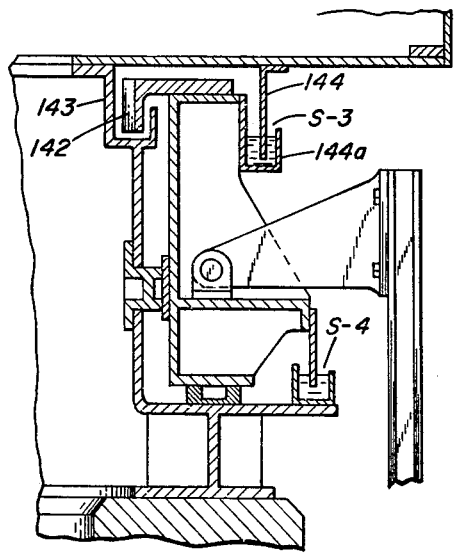
Figure 21:
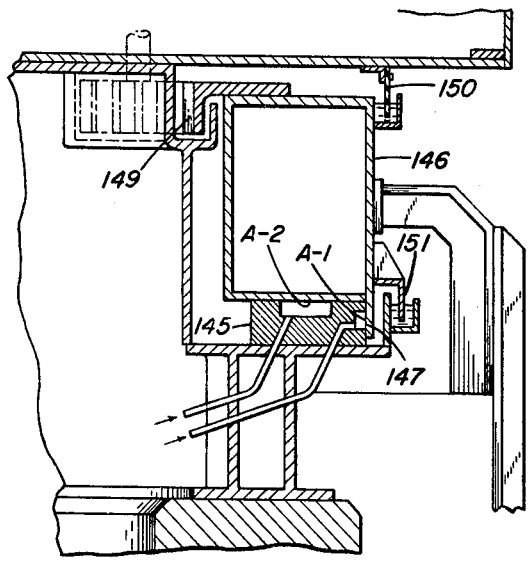
Figure 22:
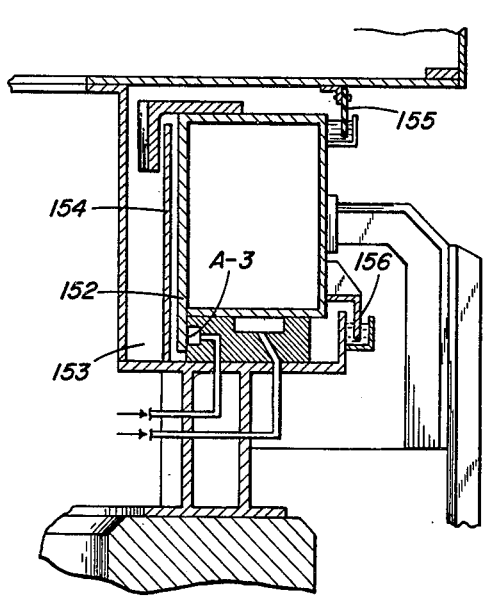
Figure 23:
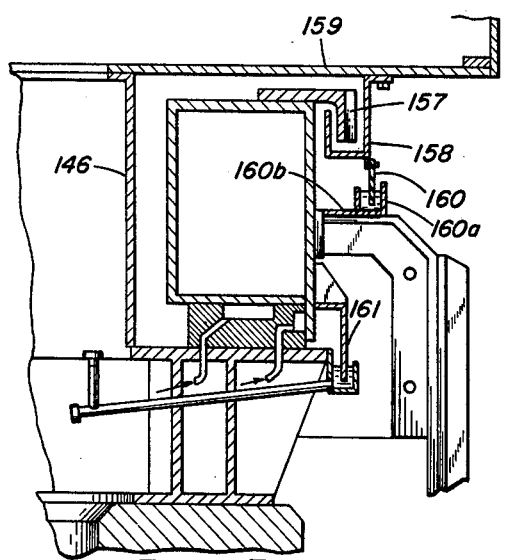

The embodiments in FIGS. 20, 21 and 22 differ from any of the other embodiments employing hydrostatic bearing means in that both the vertical thrust bearing pads and the radial bearing pads are joined together in bearing blocks each of which contains a horizontal hydrostatic bearing area and a radial hydrostatic guide bearing area.

Accordingly, in FIG. 20 an annular bearing member 146 of box-shaped profile has along the outer periphery a downward cylindrical wall extension 147 providing an inner cylindrical track for the hydrostatic radial bearing area A–1 of the bearing block. This block also has a horizontal hydrostatic bearing area A–2 supporting the rotary bearing member and rake structure connected thereto. This embodiment employs an internally toothed bull gear 149. An upper annular sealing device 150 and a lower annular sealing device 151 arranged and effective substantially in the manner of FIG. 19. The bull gear in this example is shown as of the internally toothed type although an externally toothed gear is applicable in the manner shown in other embodiments.

The embodiment in FIG. 21 differs from that of FIG. 20 by having the hydrostatic bearing block in radial bearing relationship with a downward cylindrical wall extension 152 along the inner periphery of the rotary bearing member, with a radial hydrostatic bearing area A–3 engaging the inner cylindrical bearing face of said downward extension of the bearing member. Also shown is a deep annular trough 153 for the bull gear, comprising an inner cylindrical wall 154 concentric with the upstanding wall of the casing structure, both walls rising from the bottom portion of the casing structure. The arrangement of the upper and lower annular sealing devices 155 and 156 is the same as in FIG. 20.

The embodiment in FIG. 22 resembles that of FIG. 20, except for the fact that it employs an externally toothed bull gear 157 operating in annular trough 158 supported from platform 159 substantially in the manner of FIG. 12, and with upper and lower annular sealing means 160 and 161 somewhat similarly arranged. The annular sealing trough 160a of device 160 has an annular horizontal flat sealing ring 160b connecting it with the annular bearing member 146.

With the oil pressure from the hydrostatic bearing pads floatingly supporting the annular member in a horizontal plane, the torque balanced drive units tend to keep the annular bearing member centered relative to the theoretical vertical axis of rotation, thereby maintaining optimum effective tooth engagement between the pinions and the gear, even while minimizing wear and tear.

Thus, the invention allows for the choice of bearing diameters for the drive head, much larger than had heretofore been considered practical, the construction of drive heads of great stability, of great load carrying capacity, of favorable load stress distribution through the bearing to the supporting hollow pier, and of high resistance or practical immunity to wear and tear.

Moreover, the improved drive head of compact design although of potentially large bearing diameter, readily lends itself for embodiment in a thickener substantially such as herein shown, featuring the caisson type center pier with the raised horizontal frame providing support for the hoist and for the radially extending bridge, and the means for withdrawal of collected sludge upwardly through a wide and freely accessible operating space in the pier.

What is claimed is:

1. In a sedimentation apparatus having a settling tank which has a stationary base portion, the combination which comprises a rotary sediment engaging rake structure turnable in said tank about a vertical axis and having a central vertical cage, an annular rotary bearing member located at the upper end of said cage substantially concentric therewith, and having an annular bottom support track face as well as a radial guide track face, connecting means effective between said annular rotary member and said cage for supporting the rake structure in torque transmitting relationship therewith, a stationary annular casing structure supported on said base portion of the tank concentric with said axis, said casing structure having an annular bottom portion and an upstanding inner peripheral wall, antifriction vertical thrust bearing means supporting said annular member and rake structure for rotation on said annular bottom portion of the casing structure, comprising a plurality of horizontal stationary oil pressure pads mounted on said bottom portion spaced around said vertical axis, and having horizontal top faces defining a horizontal supporting plane cooperating with said bottom support track face of the annular member, pressure oil supply means for operating said pressure pads to floatingly support said annular member with said rake structure for rotation, said bottom portion of the casing structure being constructed and arranged to receive and collect and discharge spent oil from said pads, radial guide bearing means provided on said casing structure, cooperative with said radial guide track face of the rotary annular member for maintaining said annular member and rake structure substantially concentric with said vertical axis, a bull gear member secured concentrically to said rotary annular member, having an annular depending toothed portion, an annular trough concentric with said axis and spaced above said bottom portion, and supported by said upstanding inner wall, said annular trough being constructed and arranged for providing therein a separate bath of lubricating oil for said depending toothed portion of the bull gear, and drive means in driving engagement with said bull gear for rotating said annular rotary bearing member and the rake structure.

2. The apparatus according to claim 1, wherein said radial bearing means comprise a plurality of vertical oil pressure pads having operating faces shaped to conform to the curvature of said radial track face on the annular member, pressure oil supply means for operating said vertical pressure pads for centering said annular member in said horizontal plane, and means for receiving, collecting, and discharging spent pressure operating oil from said vertical pads.

3. The apparatus according to claim 1, wherein said connecting means comprise a plurality of connections evenly spaced around the vertical axis of the annular rotary member connecting the top end portion of the cage to said annular member thereby supporting the weight of said rake structure upon said rotary annular member, and separate torque transmitting devices effective between said rotary annular member and the top end portion of said cage.

4. The apparatus according to claim 1, wherein said rake structure is effective to move sediment over the tank bottom towards the axis of rotation, wherein there is provided a substantially cylindrical hollow upwardly open pier defining an operating space therein, located within said cage substantially concentric therewith, with the addition of a plurality of columns spaced around said axis of rotation and located within the area of said operating space adjacent to the inner face of said hollow pier, and extending a substantial distance upwardly beyond the upper end of said cage structure, a frame rigidly interconnecting the upper ends of said columns, a bridge extending radially of said tank, with its inner end supported by said frame structure and said columns, pump means located at the bottom of said operating space, having an intake connection for drawing sediment collected in a zone surrounding the foot end of said pier, and having discharge conduit means for delivering sediment upwardly in said operating space and outwardly across said bridge, and feed conduit means supported by said bridge for conveying feed slurry towards the center of the tank.

5. The apparatus according to claim 1, wherein said bull gear has an internally toothed depending portion, an outer flange portion fixed to said rotary member, and said annular trough is provided directly upon said upstanding inner peripheral wall of the casing structure and located above said radial bearing means.

6. The apparatus according to claim 1, wherein said bull gear has an internally toothed depending portion, and said annular trough is provided directly upon said inner peripheral wall of the casing structure and located above said radial bearing means, and wherein said connecting means are secured to the top face of said rotary annular member, so as to transmit the weight of the rake structure substantially vertically directly down to said thrust bearing means.

7. The sedimentation apparatus according to claim 1, wherein said annular rotary bearing member is of substantially box-like cross-sectional profile, wherein said bull gear member comprises an annular outwardly directed horizontal flange and an annular internally toothed portion depending from the inner portion of said flange, with means for fastening said flange atop said annular member with said depending toothed portion located above said radial guide bearing means, and wherein said annular trough is provided directly upon said inner peripheral wall of the casing structure.

8. The apparatus according to claim 1, wherein said drive means comprise a pinion in driving engagement with the bull gear, and wherein the bottom of said trough has guide bearing means for said pinion.

9. The apparatus according to claim 7, wherein said radial guide bearing means comprise a plurality of vertical oil pressure pads having operating faces shaped to conform to the curvature of said radial track face on the annular member, pressure oil supply means for operating said vertical pressure pads for centering said annular member in said horizontal plane, and means for receiving, collecting, and discharging spent pressure operating oil from said vertical pads.

10. The apparatus according to claim 1, wherein said cage is of polygonal configuration comprising vertical members constituting respective corners of the polygonal configuration, and transverse members rigidly interconnecting respective vertical members and thus defining the sides of the polygon of said configuration, radial members extending inwardly rigidly from the upper end portion of said vertical members, means for mounting the inner ends of said radial members of said rotary annular member, thereby supporting the weight of the rake structure, and a plurality of torque transmitting devices evenly spaced around said vertical axis, and located substantially midway between the ends of respective transverse members, and effective between said rotary annular member and respective transverse members of the cage.

11. The apparatus according to claim 1, wherein said connecting means comprise a plurality of connections spaced around the vertical axis of the rotary bearing member connecting the top end portion of said cage to said rotary member thereby supporting the weight of said rake structure upon said rotary member, and separate torque transmitting means effective between said rotary member and said rake carrying cage.

12. The apparatus according to claim 11, wherein said torque transmitting means comprise a plurality of torque transmitting devices each provided with adjustable means operable to attain uniform torque transmission through said devices.

13. The apparatus according to claim 11, wherein said torque transmitting devices comprise one abutment member on said rotary annular member and another abutment member on the cage, said abutment members cooperating to transmit torque, and means are provided for adjusting said abutment members relative to one another.

14. The apparatus according to claim 13, wherein said abutment members are adjustable relative to each other by the provision of set screw means.

15. A sedimentation apparatus according to claim 1, wherein said rake structure is effective to move sediment over the tank bottom towards the center of said rake structure, wherein said annular casing structure is supported upon a hollow upwardly open pier rising from said tank bottom within said cage substantially concentric with said vertical axis, and providing operating space therein, wherein a plurality of columns is spaced around said axis of rotation and located within the area of said operating space adjacent to the inner face of said hollow pier, and extending a substantial distance upwardly beyond the upper end of said cage, frame structure is provided rigidly interconnecting the upper ends of said columns, with a bridge extending radially of said tank, having its inner end supported by said frame structure and said columns, pump means are located at the bottom of said operating space, having an intake connection for drawing sediment delivered by the rake structure into a collecting zone surrounding the foot end of said pier, and having discharge conduit means for delivering sediment upwardly through said operating space and then outwardly across said bridge, feed conduit means are supported by said bridge for carrying feed slurry towards the center of the rake structure, a plurality of pinion drive units are supported on said stationary annular casing structure, each having a pinion in driving engagement with said bull gear, each said drive unit having worm drive means, with the addition of means for interbalancing the axial torque reaction forces of the worm shafts of said worm drive means, said interbalancing means being constructed and arranged so as to substantially clear the area of said operating space.

16. In a sedimentation apparatus having a tank and rotating sediment engaging rakes therein, a column rising from the tank bottom, a central vertical cage structure carrying said rakes, and means for rotatably supporting said rake carrying structure on said column, the combination which comprises;
  a stationary annular support structure supported on said column,
  a rotary bearing ring member having an inner radial bearing surface and a separate annular bottom thrust bearing surface,
  antifriction thrust bearing means on said stationary annular support structure engaging the bottom bearing surface of said bearing ring member,
  radial guide bearing means on said annular support structure engaging the inner radial bearing surface of said bearing ring member,
  a toothed bull gear secured to said bearing ring member concentric therewith,
  drive means for said bull gear,
  and means securing said rake carrying structure to said bearing ring member, comprising a plurality of connections spaced around the vertical axis of the rotary bearing ring member connecting the top end portion of said cage to said ring member thereby supporting the weight of said rake structure upon said rotary member, and separate torque transmitting means effective between said ring member and said rake carrying cage structure.

17. The apparatus according to claim 16, wherein said separate torque transmitting means comprise a plurality of torque transmitting devices each provided with adjustable means operable to attain uniform torque transmission through said devices.

18. The apparatus according to claim 16, wherein said cage is of polygonal configuration comprising vertical members constituting respective corners of the polygonal configuration, and transverse members rigidly interconnecting respective vertical members and thus defining the sides of the polygon of said configuration, radial members extending inwardly rigidly from the upper end portion of said vertical members, means for mounting the inner ends of said radial members on said rotary member, thereby supporting the weight of the rake structure, and a plurality of torque transmitting devices evenly spaced around the vertical axis of said rotary member, and located substantially midway between the ends of respective transverse members, and effective between said rotary member and respective transverse members of the cage.

19. The apparatus according to claim 16, wherein said torque transmitting means comprises a plurality of torque transmitting devices arranged in alternation with said weight supporting connections.

20. The apparatus according to claim 1, wherein there are provided two individually operable hydraulic pressure systems for supplying oil to said horizontal pressure bearing pads, each system being adapted to operate in the event of stoppage of oil supply by the other system.

21. The apparatus according to claim 1 wherein there are provided two individually operable systems of horizontal pressure bearing pads, each system when in operation being adapted to operatively support said annular rotary member with the rake structure, and means for operating said systems in alternation, and for insuring overlap of the operations at the point of change from one system to the other to insure continuity of thickener operation.

22. The apparatus according to claim 1, wherein there are provided two individually operable oil pressure supply systems providing pressure oil to the bearing pads, and means for operating said systems in alternation.

23. In a sedimentation apparatus having a settling tank which has a stationary base portion, the combination which comprises a rotary sediment engaging rake structure turnable in said tank about a vertical axis and having a central verticle cage,
  a rotary annular bearing member located at the upper end of said cage substantially concentric therewith, and having an annular bottom support face and a seperate radical guide face,
  connecting means effective between said annular rotary member and said cage for supporting the rake structure into torque transmitting relationship therewith,
  a stationary annular casing structure supported on said base portion of the tank concentric with said axis, said casing structure having an annular bottom portion and an upstanding inner peripheral wall,
  antifriction vertical thrust bearing means supporting said annular member and rake structure for rotation on said annular bottom portion of the casing structure,
  radial guide bearing means provided on said casing structure, cooperative with said radial guide track face to the rotary annular member for maintaining the same and the rake structure substantially concentric with said vertical axis,
  a bull gear member secured concentrically to said rotary annular member, having an annular depending tooth portion,
  an annular trough concentric with said axis and rigidly connected to said casing structure, said annular trough being constructed and arranged for providing therein a separate bath of lubricating oil for said depending toothed portion of the bull gear,
  and drive means in driving engagement with said bull gear for rotating said annular rotary bearing member and the rake structure.

24. The sedimentation apparatus according to claim 23, wherein said bull gear has an internally toothed depending portion, and, said annular trough is carried directly by said upstanding inner peripheral wall of the casing structure.

25. The apparatus according to claim 23, wherein said connecting means comprise a plurality of connections spaced around the vertical axis of the rotary annular member securing the top end portion of said cage to said rotary member thereby supporting the weight of said rake structure upon said rotary member, and separate torque transmitting means effective between said rotary member and the top end portion of said cage.

26. The apparatus according to claim 23, wherein said cage is of polygonal configuration comprising vertical members constituting respective corners of the polygonal configuration, and transverse members rigidly interconnecting respective vertical members and thus defining the sides of the polygon configuration, radial members extending inwardly rigidly from the upper end portion of said vertical members, means for mounting the inner ends of said radial members on said rotary annular member, thereby supporting the weight of the rake structure, and a plurality of torque transmitting devices evenly spaced around the vertical axis of said rotary member, and located substantially midway between the ends of respective transverse members, and effective between said rotary member and respective transverse members of the cage.

27. The apparatus according to claim 25, wherein said torque transmitting means comprise a plurality of torque transmitting devices each provided with adjustable means operable to attain uniform torque transmission through said devices.

28. The apparatus according to claim 25, wherein said torque transmitting devices comprise one abutment member on said rotary annular member and another abutment member on the associated portion of the cage, and means for adjusting said abutment members relative to one another.

29. A heavy duty sedimentation apparatus including a tank having a pier rising from the tank bottom, and having rotatable sediment engaging rakes in the tank, comprising in combiantion a bearing ring consisting of an annular hollow box girder of rectangular cross-section, having a generally horizontal upper face and a lower generally horizontal annular bearing face, and generally vertical inner and outer faces, annular thrust bearing means supported on said pier and acting on the under face of said girder to support the same for rotation on said pier, radial bearings means supported on said pier acting on a vertical face of the girder for guiding it against radial movement, an internally toothed bull gear concentric with and fastened to said girder, a cage surrounding the pier and carrying said rakes, support means secured to said girder and extending outwardly to the cage and secured thereto to support the rakes, and means for driving said bull gear to rotate the rakes.

30. The invention as set forth in claim 29 in which a casing mounted on said pier cooperates with said girder to enclose the bull gear and the annular thrust bearing means and the radial bearing means, and forms a primary trough for said bearing means, and a secondary trough spaced above said primary trough for submerging a depending portion of the gear in oil.

31. The invention according to claim 29, in which said support means are secured to the top face of the rotary box girder to transmit the weight of the rake structure downwardly to the thrust bearing means and pier, and in which torque elements separate from said support means are secured to the outer face of said girder and to said cage to transmit driving torque to the cage.

32. In a sedimentation apparatus having a settling tank which has a stationary base portion, the combination which comprises a rotary sediment engaging rake structure turnable in said tank about a vertical axis and having a central vertical cage, a rotary annular bearing member located at the upper end of said cage substantially concentric therewith, and having an annular bottom support track face as well as a radial guide track face, connecting means effective between said annular rotary member and said cage for supporting the rake structure in torque transmitting relationship therewith, a stationary annular casing structure supported on said base portion of the tank concentric with said axis, said casing structure having an annular bottom portion and an upstanding inner peripheral wall, vertical thrust bearing means supporting said rotary annular member and rake structure for rotation on said annular bottom portion of the casing, radial guide bearing means provided on said casing structure, cooperative with said radial guide track face of the rotary annular member for maintaining the same and the rake structure substantially concentric with said vertical axis, a bull gear member secured concentrically to said rotary member, having an annular depending tooth portion, an annular vertical wall surrounded concentrically by said upstanding peripheral wall of the casing structure, and constituting therewith an annular trough, said trough being constructed and arranged for providing therein a separate bath of lubricating oil for said depending toothed portion of the bull gear, and drive means in driving engagement with said bull gear for rotating said annular rotary bearing member and the rake structure.

33. The apparatus according to claim 32, wherein said rotary annular member comprises a vertical cylindrical body portion, a top flange portion extending radially outwardly from the end of said body portion, and having said bull gear mounted thereon, a bottom flange portion extending radially outwardly from the bottom end of said body portion, and providing said annular bottom track face, and a horizontal annular shelf extending outwardly from said body portion intermediate said top and bottom flange portions, and wherein said connecting means for the cage are mounted on said annular shelf.

34. The apparatus according to claim 33, with the addition of an annular plate structure fixed to the upper end of said upstanding wall and extending outwardly therefrom, upper annular sealing means effective between the upper portion of said rotary annular member and the adjoining portion of said plate structure, and lower annular sealing means effective between and intermediate the annular shelf and said bottom portion of the casing structure.

35. The apparatus according to claim 23, wherein said rotary annular bearing member is substantially in the form of a cylindrical member having a horizontal annular bottom end portion providing said bottom track face, and having a horizontal annular top end portion presenting an annular top face, wherein said bull gear is an externally toothed gear mounted on said top face of the rotary member, wherein a top structure is fixed to the upper end of said upstanding inner peripheral wall, extending radially outwardly therefrom a distance beyond the maximum radius of said gear, and having said drive means mounted thereon, and having said annular trough depending therefrom, and means connecting said cage of the rake structure to said rotary bearing member in torque-transmitting relationship therewith, said connecting means being located intermediate said bottom support track face and said gear.

36. The apparatus according to claim 35, wherein said rotary annular member comprises a vertical peripheral body portion, a top flange portion extending outwardly from the top end of said body portion, and having said bull gear mounted thereon, a bottom flange portion extending outwardly from the bottom end of said body portion, and providing said annular bottom track face, and a horizontal annular shelf extending outwardly from said body portion intermediate said top and bottom flange portions, and wherein said connecting means for the cage are mounted on said annular shelf.

37. The apparatus according to claim 35, with the addition of the first annular sealing means concentric with said rotary member, and effective between said trough and the upper portion of said rotary annular member, and a second annular sealing means concentric with said first sealing means, and effective between said annular bottom portion of the casing structure and the lower portion of said rotary annular member.

38. The apparatus according to claim 23, wherein said vertical thrust bearing means comprise hydrostatic bearing pads, and said radial guide bearing means comprise roller bearing means effective between said rotary bearing member and said upstanding wall.

39. The apparatus according to claim 23, wherein said radial guide bearing means are effective between said rotary bearing member and said upstanding wall, and both said vertical thrust bearing means and said radial guide bearing means comprise roller bearings.

40. The apparatus according to claim 37, wherein said second annular sealing means is effective between said annular bottom portion of the casing structure and the intermediate annular shelf of said rotary annular shelf of said rotary annular member.

41. Apparatus according to claim 23, wherein at least said vertical thrust bearing means comprise hydrostatic bearing pads, and wherein the outer periphery of said annular bottom portion of the casing structure is formed with a depressed annular trough concentric therewith for the collection and drainage of spent hydrostatic pressure oil, and a drain connection therefor.

42. The apparatus according to claim 41, with the addition of annular sealing means comprising a sealing sleeve depending from said rotary annular member into sealing relationship with said depressed annular trough.

43. The apparatus according to claim 23, wherein said rotary annular member has a depending cylindrical skirt portion concentric therewith, providing a radial track face, and wherein said vertical thrust bearing means and said radial guide bearing means are in the form of hydrostatic bearing pads cooperative with said annular bottom track face and with said radial guide face of the rotary annular member respectively.

44. A heavy duty sedimentation apparatus including a tank having a pier rising from the tank bottom, and having sediment engaging rakes in the tank, which comprises in combination a bearing ring consisting of an annular hollow box girder of rectangular cross-section, having a generally horizontal top face and a horizontal annular bottom bearing face and also having a cylindrical bearing face, annular thrust bearing means supported on said pier, and engaged by said bottom face of the girder to support the same for rotation, radial bearing means supported on said pier, and engaging said cylindrical bearing face of the girder for guiding it against radial movement, a bull gear concentric with and mounted on said girder concentric therewith, a cage surrounding the pier and carrying said rakes, support means secured to said girder and extending outwardly to the cage and secured thereto to support the rakes, and means for driving the bull gear to rotate the rakes.

45. The apparatus according to claim 44, wherein said annular box girder and said vertical thrust bearing means and said radial bearing means are located in an annular trough mounted atop said pier, and wherein at least said vertical thrust bearing means are in the form of hydrostatic pads.

46. The apparatus according to claim 44, wherein said annular box girder has a depending cylindrical skirt portion concentric therewith, providing said cylindrical radial bearing face, and wherein said radial bearing means are in the form of radial hydrostatic bearing pads cooperating with said cylindrical bearing face.

References Cited
UNITED STATES PATENTS 3,241,682   3/1966   Cookney et al. _____ 210—528

JAMES L. DECESARE, Primary Examiner

Disclaimer 3,498,468.—*Russell C. Raynor*, South Salem, N.Y. SEDIMENTATION TANK. Patent dated Mar. 3, 1970. Disclaimer filed Mar. 4, 1971, by the assignee, *Dorr-Oliver Incorporated*.

Hereby enters this disclaimer to claims 35, 36, 37 and 40 of said patent.

[*Official Gazette September 7, 1971.*]